US011765472B2

(12) United States Patent
Barkan et al.

(10) Patent No.: US 11,765,472 B2
(45) Date of Patent: Sep. 19, 2023

(54) DEVICES, SYSTEM, AND METHODS USING TRANSFLECTIVE MIRRORS WITH ROLLING SHUTTER SENSORS

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 94 days.

(21) Appl. No.: 17/463,348

(22) Filed: Aug. 31, 2021

(65) Prior Publication Data

US 2023/0063717 A1 Mar. 2, 2023

(51) Int. Cl.
*H04N 25/531* (2023.01)
*G06K 7/14* (2006.01)
*G06T 7/00* (2017.01)
*H04N 25/42* (2023.01)

(52) U.S. Cl.
CPC ......... *H04N 25/531* (2023.01); *G06K 7/1443* (2013.01); *G06T 7/0002* (2013.01); *H04N 25/42* (2023.01); *G06T 2207/30168* (2013.01)

(58) Field of Classification Search
CPC ............. H04N 25/531; H04N 1/00334; G06K 7/10752; G06K 7/10831
See application file for complete search history.

(56) References Cited

U.S. PATENT DOCUMENTS

| | | | |
|---|---|---|---|
| 7,428,378 B1 * | 9/2008 | Warpakowski Furlan | H04N 23/74 348/370 |
| 7,453,514 B2 * | 11/2008 | Furlan | H04N 23/55 348/E5.04 |
| 7,533,819 B2 * | 5/2009 | Barkan | G06K 7/10722 235/462.43 |
| 7,675,569 B2 * | 3/2010 | Maeda | H04N 23/74 348/371 |
| 7,760,265 B2 * | 7/2010 | You | H04N 23/73 348/363 |

(Continued)

FOREIGN PATENT DOCUMENTS

CN 110121021 A * 8/2019
DE 102010023014 A1 * 12/2011 .......... H04N 5/2329
KR 20160036647 A * 4/2016

*Primary Examiner* — Jason A Flohre
(74) *Attorney, Agent, or Firm* — Yuri Astvatsaturov (57) ABSTRACT

A system and methods for implementing a transflective mirror as a rolling shutter sensor. The method includes. The method includes a controller setting a current state of an obfuscator to a transmissive state at a first point in time, the first point in time being a time when all pixels of an imaging sensor are in an active state. An imaging sensor then obtains an image of an object in a field of view of the imaging sensor. The image is obtained at a time when the obfuscator is in the transmissive state. The controller then sets the current state of the obfuscator to an obfuscative state at a point in time before a single pixel of the plurality of pixels is switched to an inactive state, wherein the active state of a pixel is a state in which a pixel is an active optical detector, and the inactive state is a state in which a pixel is not an active optical detector.

18 Claims, 4 Drawing Sheets

(56) References Cited

U.S. PATENT DOCUMENTS

| | | | | |
|---|---|---|---|---|
| 7,777,796 | B2* | 8/2010 | Inoue | H04N 23/60 |
| | | | | 348/296 |
| 7,866,557 | B2* | 1/2011 | He | G06K 7/10722 |
| | | | | 348/297 |
| 8,033,472 | B2* | 10/2011 | Giebel | G06K 7/10722 |
| | | | | 235/462.43 |
| 8,073,321 | B2* | 12/2011 | Furlan | G03B 7/16 |
| | | | | 396/157 |
| 2004/0223075 | A1* | 11/2004 | Furlan | H04N 23/75 |
| | | | | 348/E5.04 |
| 2006/0118627 | A1* | 6/2006 | Joseph | G06K 7/10732 |
| | | | | 235/454 |
| 2007/0241195 | A1* | 10/2007 | Hussey | G06K 7/10722 |
| | | | | 235/472.01 |
| 2008/0164314 | A1* | 7/2008 | Meier | G06K 7/10752 |
| | | | | 235/462.1 |
| 2009/0303362 | A1* | 12/2009 | Ebihara | H04N 25/53 |
| | | | | 348/E5.091 |
| 2010/0045847 | A1* | 2/2010 | Ryu | H04N 23/54 |
| | | | | 348/E5.037 |
| 2010/0329657 | A1* | 12/2010 | Hosoi | G03B 15/16 |
| | | | | 348/371 |
| 2013/0161392 | A1* | 6/2013 | Goren | G06K 7/10722 |
| | | | | 235/455 |
| 2017/0364736 | A1* | 12/2017 | Ollila | H04N 5/33 |
| 2019/0132500 | A1* | 5/2019 | Slama | G02B 13/06 |
| 2020/0404198 | A1* | 12/2020 | Kobayashi | H04N 25/533 |
| 2020/0404220 | A1* | 12/2020 | Slama | H04N 23/55 |
| 2022/0210309 | A1* | 6/2022 | Feingold | A61B 1/0684 |
| 2022/0244531 | A1* | 8/2022 | Lintz | G02B 27/283 |

* cited by examiner

DEVICES, SYSTEM, AND METHODS USING TRANSFLECTIVE MIRRORS WITH ROLLING SHUTTER SENSORS

BACKGROUND

Typical barcode readers, such as handheld barcode readers, point of sale scanners, and direct part marking scanners, require high quality, low-blur images to decode barcodes found in the images. Therefore, barcode scanners are motion sensitive which may be problematic due to the nature of many applications of scanning barcodes. For example, a person using a handheld scanner may move while the scanner obtains an image, or a person may quickly move an item across a scanners field of view, both of which may cause a blurry, low-quality image. Additionally, it is desirable for the imaging sensor of a barcode reader to be exposed to a target image for just enough time to capture the image. Longer exposure times may cause blurring of the image, or expose the imaging sensor to more background noise, targeting radiation, or other noise sources preventing the barcode reader from decoding a barcode.

A shutter may be implemented to control the exposure time of an imaging sensor for a barcode reader. Rolling shutter sensors are imaging sensors that capture an image on adjacent rows of sensor pixels over different periods of time. Typically, a mechanical shutter is opened and closed, or rotated in the case of a rotary disc shutter, to expose the adjacent sets of pixels at different times. Rolling shutters are not typically implemented in barcode readers due to the size and mechanical requirements of a rolling shutter sensor. As previously mentioned, rolling shutter sensors typically employ a mechanical shutter which cannot open and close/rotate at the required frame rate for efficient image capture and decoding as performed by a barcode reader. Additionally, mechanical shutters are bulky and require motors or mechanical actuators which would increase the weight, size, and points of possible failure of a barcode reader. Further, a rotational shutter causes complications when trying to change exposure time and frame rate. As such, it could be beneficial for a barcode reader to implement a rolling shutter sensor to improve image quality and resolution, while not having to simultaneously sacrifice performance, size, decoding efficacy or speed, and robustness, with respect to exposure times and frame rates, of the barcode imaging system.

SUMMARY

In an embodiment, the present invention is a method of capturing an image with an optical assembly for an optical imaging shutter system. The method comprises setting, by a controller, a current state of an obfuscator to a transmissive state at a first point in time, the first point in time being a time when all pixels of an imaging sensor are in an active state, obtaining, by an imaging sensor having the plurality of pixels, an image of an object in a field of view of the imaging sensor, the image obtained at a time when the obfuscator is in the transmissive state, and setting, by the controller, the current state of the obfuscator to an obfuscative state at a point in time before a single pixel of the plurality of pixels is switched to an inactive state, wherein the active state is a state in which a pixel is an active optical detector, and the inactive state is a state in which a pixel is not an active optical detector.

In a variation of the current embodiment, the transmissive state comprises a state wherein the obfuscator transmits more than 50% of radiation incident on the obfuscator along an optical axis, and wherein the obfuscative state is a state wherein the obfuscator obfuscates more than 50% of radiation incident on the obfuscator along the optical axis.

In another variation of the current embodiment, the transition of the obfuscator from the obfuscative state to the transmissive states occurs faster than a temporal image blur threshold, wherein the temporal image blur threshold is a time duration limit at which a transition of the obfuscator slower than the temporal image blur threshold results in an image that contains too much blur to decode.

In another embodiment, the present invention is an optical imaging shutter system comprising an obfuscator disposed along an optical axis configured to receive radiation from an object of interest with the obfuscator having (i) a first state wherein the obfuscator obfuscates a majority of radiation propagating along the optical axis, and (ii) a second state wherein the obfuscator transmits a majority of radiation propagating along the optical axis. A controller is communicatively coupled to the obfuscator and configured to control a current state of the obfuscator, and an imaging sensor is disposed along the optical axis configured to receive an image of the object and to generate an electrical signal indicative of the received image, the imaging sensor having a plurality of pixels with each pixel of the plurality of pixels having an (i) active state wherein the pixel is active as an optical sensor for an active duration of the pixel, and (ii) an inactive state wherein the pixel is not active as an optical sensor for an inactive duration of the pixel. A processor is in communication with computer-readable media storing machine readable instructions that, when executed, cause the optical assembly to set, by the controller, the current state of the obfuscator to the first state at a point in time when all pixels of the plurality of pixels are in an active state, obtain, by the imaging sensor, an image of the object during an image capture duration wherein all of the pixels of the plurality of pixels are in the active state, and set, by the controller, the current state of the obfuscator to the second state at a point in time before a single pixel of the plurality of pixels is in an inactive state.

In yet another embodiment, the present invention is an optical assembly for an optical imaging shutter system. The optical assembly comprises an obfuscator disposed along an optical axis configured to receive radiation from an object of interest with the obfuscator having (i) a first state wherein the obfuscator obfuscates a majority of radiation propagating along the optical axis, and (ii) a second state wherein the obfuscator transmits a majority of radiation propagating along the optical axis, and an imaging sensor disposed along the optical axis configured to receive an image of the object and to generate an electrical signal indicative of the received image, the imaging sensor having a plurality of pixels with each pixel of the plurality of pixels having an (i) active state wherein the pixel is active as an optical sensor for an active duration of the pixel, and (ii) an inactive state wherein the pixel is not active as an optical sensor for an inactive duration of the pixel.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Rolling shutter sensors are lost cost, high resolution imaging sensors. However, rolling shutter sensors are typical not viable for use in barcode reader systems due to mechanical shutter speeds, motors, bulky components, and the fact that they are very motion sensitive. Mechanical shutters are slow compared to optical barcode decoding system requirements and are therefore not viable for use with barcode systems. The disclosed system and method enable the use of a rolling shutter sensor in a barcode imaging system by using a fast transitioning obfuscative optical element as a shutter.

Figure 1:
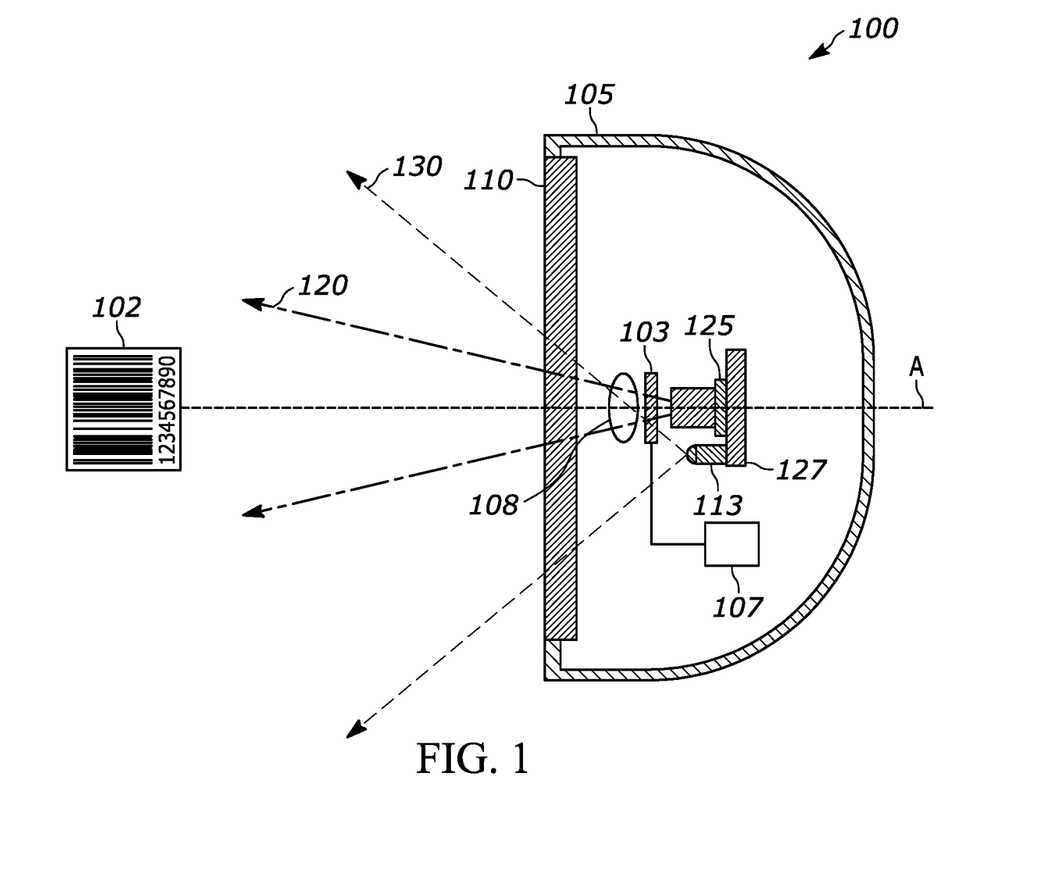
FIG. 1 illustrates an example barcode reader that uses an obfuscative element to operate as a rolling shutter sensor barcode reader for imaging an object of interest.

Referring to FIG. 1, an example barcode reader 100 is shown that uses an obfuscative element 103 to operate as a rolling shutter sensor barcode reader for imaging an object of interest 102. The obfuscative element 103 is disposed inside of a housing 105 along an optical path A of field of view 120 of an imaging sensor 125. A controller 107 controls a state of the obfuscative element between an obfuscative state and a transmissive state. The obfuscative state is an optical state in which the obfuscative element obfuscates or obscures a majority of radiation from the imaging sensor 125, and the transmissive state is a an optical state wherein the obfuscator transmits a majority of radiation to the imaging sensor 125. The imaging sensor 125 is mounted on an imaging circuit board which may provide power to the imaging sensor 125, control of operation of the sensor 125, on/off board communications of data to and from the imaging sensor 125, among other operations and purposes. The imaging sensor 125 may be a CMOS device, or other imaging sensor capable of functionality as a rolling shutter sensor. The imaging sensor 125 may have a fixed exposure time, or the exposure time and rolling shutter functionality may be tuned to change the exposure time based on an object of interest, a distance of the object of interest, an illumination of the object of interest, etc.

A lens 108 is disposed along the optical path A to focus images received by the barcode reader 100 onto an imaging plane at the imaging sensor 125. A window 110 is disposed along the optical axis A to provide a transmissive surface for optical radiation to pass along the optical axis into the housing 105. The window 110 acts as an aperture and may be useful for preventing stray light and optical noise from entering the housing 105. Further, the window may be a material or have coatings to perform as a filter to reduce noise or to select wavelengths of light for imaging at the imaging sensor 125. Each of the window 110, lens 108, and obfuscative element 103 are disposed to image the object of interest 102 onto the imaging sensor 125.

While not illustrated, a person of ordinary skill in the art would recognize that additional or fewer optical elements may be implemented along the optical axis for imaging of the object of interest. For example, one or more additional lenses, wavelength filters, spatial filters, polarizers, beam splitters, mirrors, waveplates, apertures, or other optical elements may be employed for imaging of the object of interest 102. In a configuration the object of interest 102 includes one or more indicia indicative of information about the object of interest, the indicia being one or more of a 1D or 2D barcode, QR code, dynamic QR code, UPC code, serial number, alphanumeric, a graphic, or another indicia.

The obfuscative element 103 may be a transflective mirror, such as the e-TransFlector™ from Kent Optronics, positioned within the housing 105 along the optical path A. As a transflective mirror, the obfuscative element 103 can be switched between a transmissive state, in which a majority of light is allowed to pass through the transflective mirror, and a reflective state, in which a majority of light is reflected off of the transflective mirror. For example, the obfuscative element 103 may switch states in response to an electrical control signal received from the controller 107. With the transflective mirror in the reflective state, the transflective mirror reflects at least a first portion of radiation in the field-of-view 120 of the imaging sensor 125. In the transmissive state, the transflective mirror allows for optical radiation within the field-of-view 120 to pass through the transflective mirror 155 along the optical path A to the imaging sensor 125. Optionally, the transflective mirror could also be switched to a partially reflective state, in which the transflective mirror would both reflect a portion of light, and transmit a portion of light. Such an example may be useful in a system that images the object of interest 102 while targeting radiation is provided to the barcode or object of interest. For example, the barcode reader 100 may further include a target radiation source 113 that provides radiation to the object of interest 102 for a user of the barcode reader to reference when positioning the object of interest for scanning, or when position the barcode reader 100 in the case of a handheld barcode reader. While not illustrated, the barcode reader 100 may further include an illumination source configured to provide illumination to a target or the object of interest 102 for imaging of the object of interest 102.

While described above as a transflective device, the obfuscative element 103 does not need to reflect optical radiation. In the obfuscative state, the obfuscative element 103 may absorb the radiation, or otherwise obscure the optical radiation to prevent the radiation from reaching the imaging sensor 125, while the obfuscative element 103 passes radiation to the imaging sensor 125 when in the transmissive state. In configurations, the obfuscative element 103 may include one or more of a transflective mirror, a different transflective element, an electrochromic device, a polymer-dispersed liquid crystal film, or another electrically controllable shutter element capable of transitioning between states at a time scale operational for a barcode reader 100.

Figure 2A:
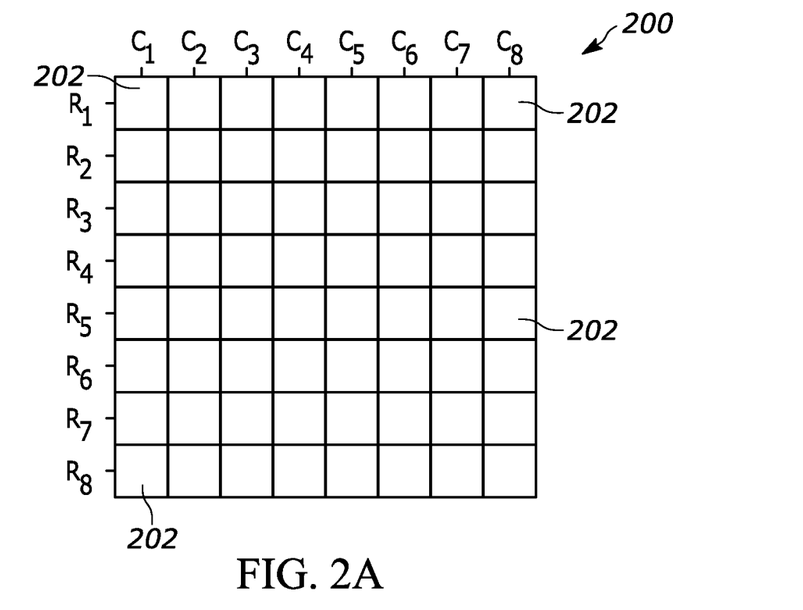
FIG. 2A illustrates an example of a pixel array of an imaging sensor having a plurality of pixel columns and pixel rows.
Figure 2B:
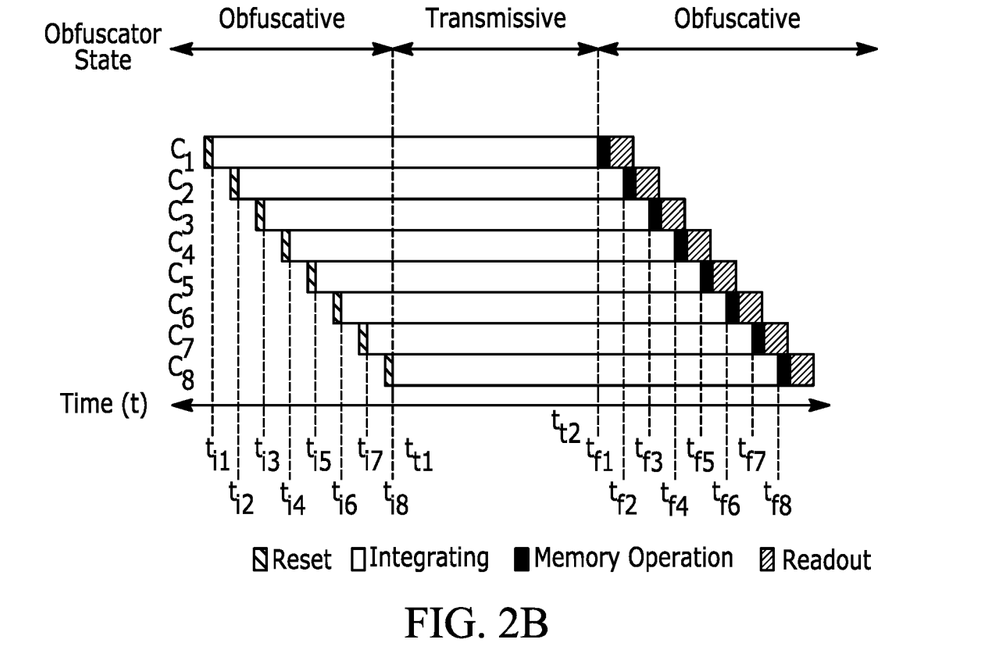
FIG. 2B illustrates a plot of pixel operation over time for a typically rolling shutter sensor.

FIG. 2A is an example of a pixel array 200 of (or a portion thereof) an imaging sensor. The pixel array 200 may be operated as a rolling shutter sensor as the imaging the sensor 125 of FIG. 1. The pixel array 200 has a plurality of columns of pixels $C_1$ through $C_8$, and a plurality of rows of pixels $R_1$ through $R_8$ with each pixel 202 belong to one column and one row. FIG. 2B is a plot of pixel operation over time for a typically rolling shutter sensor. Operation of the barcode reader 100 and imaging sensor 125 of FIG. 1 will be described with simultaneous reference to FIGS. 1, 2A, and 2B as a rolling shutter sensor.

Each pixel 202 of the pixel array 200 may be activated and deactivated independently or in groups by the circuit board 127, or by another controller. When activated, a pixel is "on" and is actively detecting light or optical radiation for capturing an image. When deactivated, a pixel is "off" and is not optically active for imaging. As illustrated in FIG. 2B, each pixel has various states during operation. A pixel is first reset to clear any residual charge from the pixel or to reset a memory of the pixel. The pixel is then activated to detect optical radiation and the pixel generates an electrical signal indicative of the detected radiation and integrates the electrical signal. The integrated signal is then stored in a memory, and eventually the integrated signal is read out from the memory for image stitching, and processing to generate an image and to identify indicia indicative of the object of interest 102. Each of the steps of resetting the pixel, detecting radiation and integrating the electrical signal, storing the integrated signal in memory, and reading out of the signal takes an amount of time that is dependent on the optical and electrical components of the pixel.

Initially, all of the pixels are in a deactivated state before a time $t_i$, and the obfuscative element 103 is initially in the obfuscative state. A controller of the circuit board 127 may then reset the first column of pixels $C_1$, and at a time $t_{i1}$ the first column of pixels $C_1$ then detects optical radiation, generates an electrical signal indicative of the detected radiation, and begins integrating the electrical signal. At a time subsequent to $t_{i1}$, the controller of the circuit board 127 resets the second column of pixels $C_2$, and at a time $t_{i2}$ the second column of pixels $C_2$ begins detecting optical radiation, generating an electrical signal indicative of the radiation, and begins integrating the electrical signal. Subsequent columns of pixels $C_3$-$C_8$ are each independently reset, and activated at respective times $t_{i3}$ to $t_{i8}$, to detect radiation, generate electrical signals, and integrate according to the predescribed pattern.

At the time $t_{i8}$ all eight of the pixel columns $C_1$-$C_8$ are activated and each pixel is on. Therefore, at the time $t_{i8}$ the controller 107 changes the state of the obfuscative element 103 from the obfuscative state to the transmissive state. The obfuscative element 103 then transmits optical radiation from the object of interest 102 to the imaging sensor 125. Each of the pixels of the pixel array 200 then detect and generate and integrate electrical signals indicative of the detected radiation. The circuit board 127 (or a controller thereon) then deactivates the first column of pixels $C_1$ at a time $t_{f1}$. The controller 107 changes the state of the obfuscative element 103 from the transmissive state to the obfuscative state at the time $t_{t2}$ at the same time as the first column of pixels $C_1$ is deactivated. In the current example, the duration of the transmissive state of the obfuscative element 103 (i.e., the duration $t_2$-$t_1$) is the same amount of time as the duration in which all of the pixels 202 of the pixel array 200 are active (i.e., the duration $t_{i8}$-$t_{f1}$). Therefore, the pixels 202 only absorb light while all pixels are active which reduces the exposure time of the imaging sensor 125. Typically, in a rolling shutter sensor, each row or column of pixels is exposed to radiation from an object at slightly different times creating greater blur than the disclosed system and method. Using the obfuscative element 103 to ensure that all of the pixels 202 are exposed to the radiation from the object of interest 102 reduces blur of an image of the object of interest 102, and increases the efficiency of decoding of indicia by the barcode read 100.

In configurations, the controller 107 may change the state of the obfuscative element 103 to the transmissive state at a time before all of the columns of pixels are active (i.e., a time before the time $t_{i8}$). For example, the target radiation source 113 may provide target radiation in the form of a crosshair or a box to indicate the field of view 120 to a user of the barcode reader 100. The targeting radiation may reflect off of the object of interest 102, or any surfaces such as an aperture window, optics, or another surface and the reflected target radiation may be reflected toward the imaging sensor 125. To prevent the targeting radiation from being captured in an image obtained by the imaging sensor 125, the target radiation source 113 may selectively provide target radiation during times when the obfuscative element 103 is in the obfuscative state, and not provide target radiation when the obfuscative element is in the transmissive state. It may be desirable to detect a portion of the target radiation in an image of the object of interest to further assist with image processing and decoding of indicia in the image. As such, the controller 107 may change the state of the obfuscative element 103 to the transmissive state at a time before the time $t_{i8}$ that the final column of pixels $C_8$ is active. Alternatively, the target radiation source 113 may provide target radiation for a period of time after the controller 107 changes the state of the obfuscative element 103 to the transmissive state at time $t_1$. As described further herein, the controller 107 may change the state of the obfuscator 103 to the obfuscative state before any pixels or columns of pixels are deactivated. In other examples, the controller 107 may change the state of the obfuscator 103 to the obfuscative state after one or more of the pixels, or one or more columns of pixels, have been deactivated depending on the time it takes for the obfuscator to transition from the transparent to the obfuscative state. Changing the obfuscator to the obfuscative state after one or more pixels are deactivated may allow a maximum amount of light through to the imaging sensor 125 in order to maximize the light exposure of pixels and minimize any motion blur that would happen in other rolling shutter sensor technologies.

After the first column of pixels $C_1$ has integrated the electrical signals of detected radiation, the controller 107 deactivates the first column of pixels at time $t_{f1}$ and the first column of pixels stores the integrated signals in a memory. The circuit board 127 may then retrieve signals indicative of the integrated signals from the memory for performing image processing and decoding of indicia of the object of interest 102. The circuit board may provide the retrieved signals to other processor and systems for performing image processing and decoding of the indicia of the object of interest 102. Each of the second through eighth columns of pixels $C_2$-$C_8$ then is deactivated at respective times $t_{f2}$-$t_{f8}$. Further, each column of pixels $C_2$-$C_8$ stores corresponding integrated signals in memory, and the memory may be readout by the circuit board 127 or by another device. As illustrated in FIG. 2B, the described system may allow for a reduced amount of memory required for storing the integrated signals as integrated signals for each column may be read out before a subsequent column's integrated signals are stored in the memory. Therefore, the described systems may provide a means for a more compact and less expensive implementation of a barcode reader.

Figure 3:
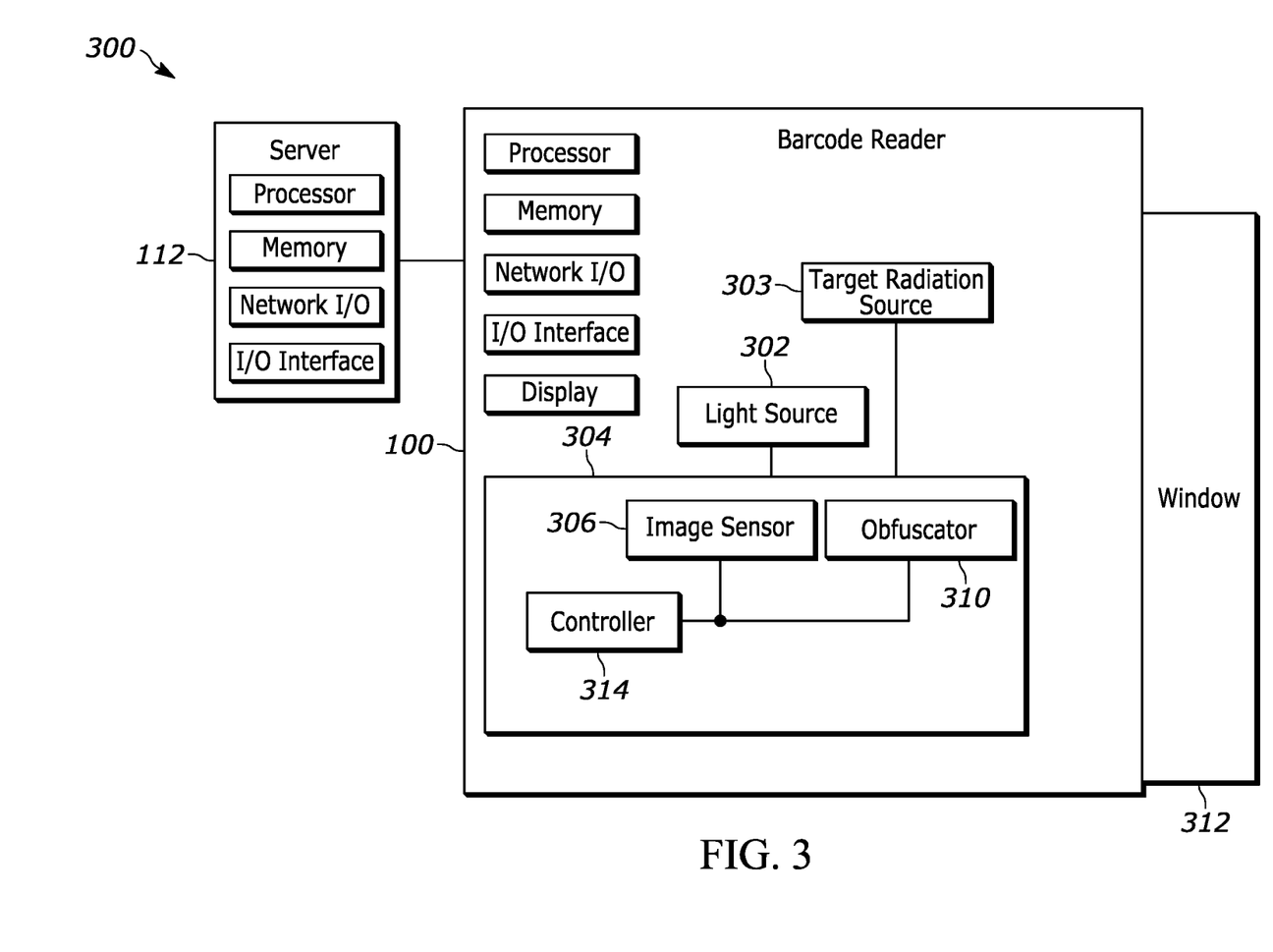
FIG. 3 illustrates a block connection diagram of system including an imaging reader as the barcode reader of FIG. 1.

FIG. 3 illustrates a block connection diagram of system 300 including an imaging reader as the barcode reader 100. In FIG. 3 the barcode reader 100 may have one or more processors and one or more memories storing computer executable instructions to perform operations associated with the systems and methods as described herein. The barcode reader 100 includes a network input/output (I/O) interface for connecting the reader to a server 112, an inventory management system (not shown), and other imaging readers. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The barcode reader 106 further includes a display for providing information such as visual indicators, instructions, data, and images to a user.

In some embodiments, the server 112 (and/or other connected devices) may be located in a scanning station or point of sales system that includes the barcode reader 100. In other embodiments, the server 112 (and/or other connected devices) may be located at a remote location, such as on a cloud-platform or other remote location. In still other embodiments, server 112 (and/or other connected devices) may be formed of a combination of local and cloud-based computers.

The server 112 is configured to execute computer instructions to perform operations associated with the systems and methods as described herein. The server 112 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

In the illustrated example, the barcode reader 100 includes a light source 302, which may be a visible light source (e.g., a LED emitting at 640 nm) or an infrared light source (e.g., emitting at or about 700 nm, 850 nm, or 940 nm, for example), capable of generating an illumination beam that illuminates the field of view 120 for imaging over an entire working distance of that field of view 120. That is, the light source 302 is configured to illuminate over at least the entire field of view 120. The illumination intensity of the light source 302 and the sensitivity of an imaging reader can determine the further and closest distances (defining the distance of the working range, also termed the scanning range) over which a good can be scanned, and a barcode on the good can be decoded. The light source 302 is controlled by processor and may be a continuous light source, an intermittent light source, or a signal-controlled light source, such as a light source trigged by an object detection system coupled (or formed as part of though not shown) to the barcode reader 100. The light source may be an omnidirectional light source.

The barcode reader 100 further includes an imaging arrangement 304 having an imaging sensor 306 positioned to capture images of an illuminated target, such as the object of interest 102 or another object having an indicia for decoding, within a working range of the field of view 120. In some embodiments, the imaging sensor 306 is formed of one or more CMOS imaging arrays. An obfuscator 310 is positioned between the imaging sensor 306 and a window 312 of the imaging reader 100. A controller 314 is coupled to the obfuscator 310 and controls the obfuscator 310 to control a state of the obfuscator. The state of the obfuscator 310 is an optical transmission state wherein the controller 314 controls the obfuscator 310 to allow a portion of optical radiation to pass through the obfuscator. The controller may control the obfuscator 310 in a binary manner wherein the obfuscator has a transmissive state that transmits greater than 50% of radiation incident on the obfuscator 310, and an obfuscative state that blocks or reflects greater than 50% of incident radiation on the obfuscator 310. The controller 314 may control the obfuscator 310 to set a plurality of states having transmissions of 10%, 20%, 30%, 40%, 50%, 60%, 70%, 80%, 90%, or approximately 100%±5%. Additionally, the controller 314 may control the obfuscator 310 to have a plurality of states with each state having a transmission percentage of less than 10%, less than 20%, less than 30%, less than 40%, less than 50%, less than 60%, less than 70%, less than 80%, less than 90%, less than 100%, greater than 10%, greater than 20%, greater than 30%, greater than 40%, greater than 50%, greater than 60%, greater than 70%, or greater than 80%, greater than 90%. The controller 314 may control the obfuscator to have an obfuscative state that has a transmission percentage of less than 10%, less than 20%, less than 30%, less than 40%, less than 50%, less than 60%, less than 70%, less than 80%, less than 90%, or less than 100%.

In the illustrated example, the controller 314 is in direct communication with the obfuscator 310. In embodiments, the controller 314 may be in direct or indirect communication (i.e., through a network, through intermediate system components, through amplifiers, etc.) with the obfuscator 310. The controller 314 may include one or more voltage sources, amplifiers, current sources, or another source of electricity, electric field, or magnetic field to control the transmission of the obfuscator 310. In embodiments, the controller is configured to access one or more obfuscator state parameters (e.g., optical state transition percentages, optical state durations, etc.) stored in the barcode reader 100, stored on the server 112, or stored on another medium.

The obfuscator 310 may include one or more of a transflector, electrochromic device, polymer-dispersed liquid crystal film, or another optical device with an electrically tunable transmission. The obfuscator may be any electrically switchable optical element that can transition from a transparent, or near transparent state (e.g., more than 50% transmissive), to an opaque or near opaque state (e.g., less than 50% transmissive). The optical transmission of the obfuscator 310 may be controllable by a voltage, current, electric potential, electric field, or magnetic field among other potential electrical control signals.

In embodiments, the imaging sensor 306 may be a charge coupled device, a rolling shutter sensor, or another solid-state imaging device. The imaging sensor 306 may be a one megapixel sensor with pixels of approximately three microns in size. In embodiments, the imaging sensor 306 includes a sensor having an active area of 3 millimeters, 4.5 millimeters, 5 millimeters, 6.8 millimeters, 7.13 millimeters, less than 5 millimeters, less than 10 millimeters, or less than 50 millimeters. The imaging sensor 112 may have a total of about 1 megapixels, 2 megapixels, 2.3 megapixels, 5 megapixels, 5.1 megapixels or more than 5 megapixels. Further, the imaging sensor 112 may include sensors with pixels having dimensions of less than 10 microns, less than 5 microns, less than 3 microns, or less than 2 microns in size in at least one dimension of the pixel. In embodiments, the image sensor includes a lens assembly configured to capture images with a modulation transfer function of 40% at 160 line pairs per millimeter. The imaging sensor 306 may include a rolling shutter sensor as described in reference to FIGS. 2A and 2B that includes a controller that controls the states of rows or columns of pixels of the imaging sensor 306. For example, the controller 314 may be in communication with the imaging sensor 306 to control pixels, rows of pixels, columns of pixels, or any plurality of pixels of the imagine sensor. The controller 314 may control pixels of the imaging sensor 306 to set pixels to an optically active state or an optically inactive state. The optically active state is considered an "on" state wherein the a pixel detectors radiation and generates an electric signal indicative of the detected, radiation, and the optically inactive state is a state wherein a pixel does not generate an electric signal indicative of detected radiation.

In some exemplary embodiments, the barcode reader 106 is implemented in a handheld bar code scanner device. When the handheld scanner is placed within a stationary cradle thereby establishing an upright scanning position, the handheld scanner may automatically sense that placement and enter the hands-free mode. In other exemplary embodiments, the barcode reader 106 is implemented as a multi-plane scanner, such as a bioptic scanner or a point of sale system.

Figure 4:
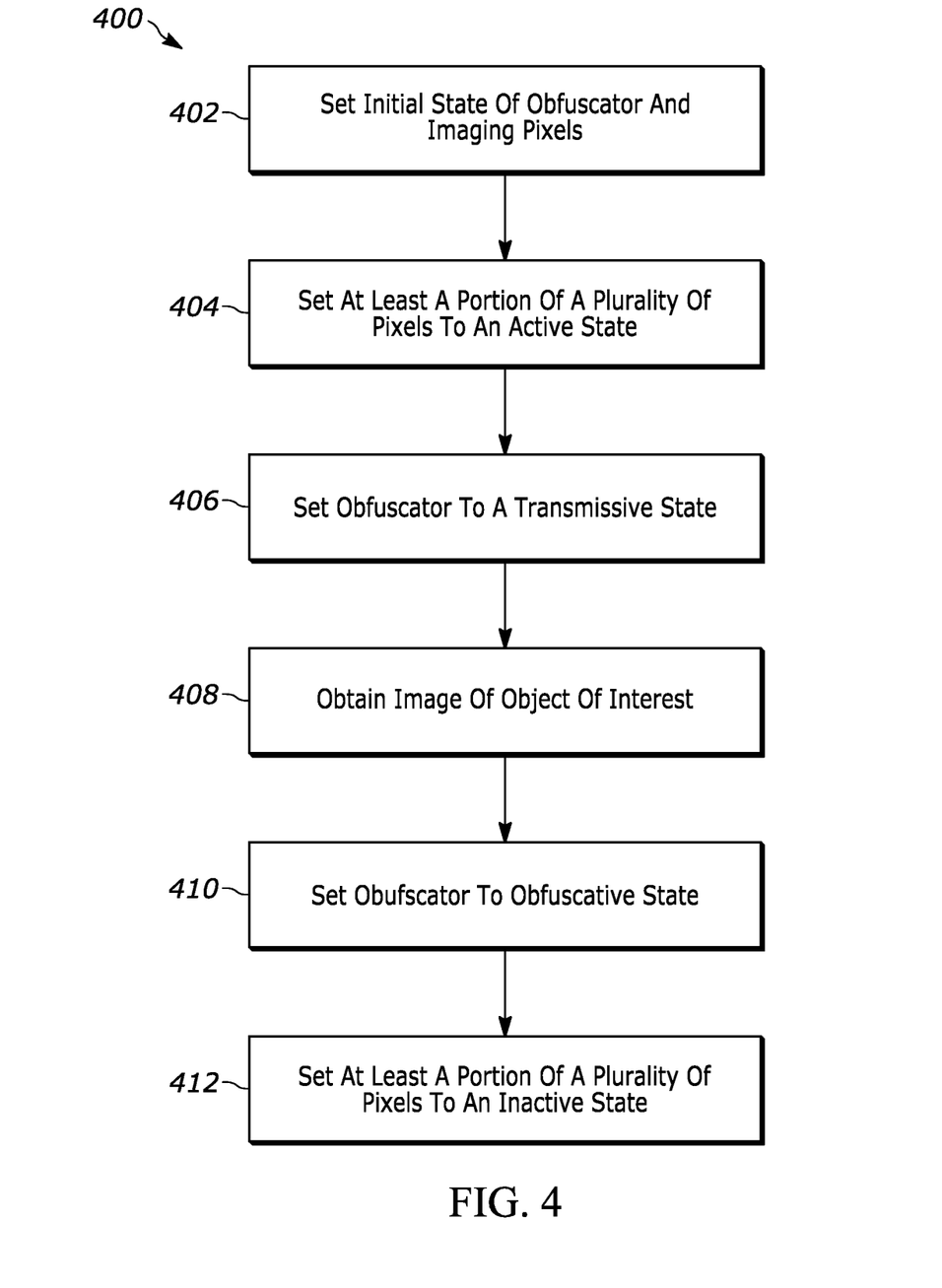
FIG. 4 is a flow diagram of a method for performing imaging of an object of interest using a rolling shutter sensor barcode.

FIG. 4 is a flow diagram of a method 400 for performing imaging of an object of interest using a rolling shutter sensor barcode. The method 400 may be performed by the barcode reader 100 illustrated in FIGS. 1 and 3 using the obfuscative element 103 as a shutter. With simultaneous reference to FIGS. 1-4, the method 400 includes the controller 314 setting an initial state of the obfuscator 310 and pixels of the imaging sensor 306 at block 402. The controller sets the initial state of the obfuscator 310 to an obfuscative state that transmits less than 50% of radiation incident on the obfuscator 310. The controller 314 sets the state of the pixels of the imaging sensor 306 to an optically inactive state. Therefore, radiation does not pass through the obfuscator 310, and the imaging sensor 306 does not detect any radiation or generate electrical signals indicative of any detected radiation.

The controller 314 sets at least a portion of pixels of the imaging sensor 306 to an optically active state at block 404. The controller 314 may set a column of pixels, a row of pixels, or any subset of pixels to the optically active state. As described in reference to FIGS. 2A and 2B, the controller may set adjacent columns, or rows, or pixels to the active state sequentially over a period of time until all of the pixels of the imaging sensor 306 are set to the optically active state.

The controller 314 then sets the state of the obfuscator 310 to the transmissive state at block 406. The transmissive state may be a state in which the obfuscator transmits greater than 50% of radiation incident on the obfuscator. The imaging sensor 306 then obtains an image of the object of interest 102 at block 408. The image contains indicia indicative of the object of interest for decoding of the indicia. The image sensor 306 then generates an electrical signal indicative of the obtained image and stores the signal in a memory or provides the signal to another system or network for processing and decoding of the indicia.

The controller 314 then sets the obfuscator 310 to the obfuscative state at block 410. In the obfuscative state, the obfuscator blocks light from reaching the imaging sensor and therefore active pixels of the imaging sensor receive little to no light. The duration of time that the obfuscator 310 is in the transmissive state determines the exposure time of pixels of the imaging sensor 306. In configurations, the exposure time of the imaging sensor may be fixed, or the controller 314 may change the exposure time of the imaging sensor 306 based on an illumination intensity of the object of interest 102, a distance of the object of interest, a specular reflectivity or diffuse reflectivity of the object of interest, or another optical parameter. In embodiments, the imaging sensor 310 may have a fixed exposure time and the controller 314 may control the obfuscator states according to the fixed exposure time of the imaging sensor 310. The controller 314 then sets at least a portion of the plurality of pixels of the imaging sensor 306 to the optically inactive state at block 412. The controller 314 continues to set pixels to the inactive state until all of the pixels of the imaging sensor 306 are set to the inactive state. In one example, as described in reference to FIGS. 2A and 2B, the controller 314 may sequentially set columns of pixels or rows of pixels to the inactive state until all of the pixels are set to the inactive state.

After a pixel, or column of pixels, has been deactivated, the pixel may send data indicative of the detected radiation to another processor, a memory, or off board to another system for further storage or processing. Further, a processor or system may query each pixel or column of pixels to obtain signal data indicative of detected radiation. After all of the pixels; or columns of pixels, have provided signal data to a processor, memory, or system for processing and generating an image of the object of interest 102 the method 400 may return to block 404 and the controller 314 may set a column of pixels, a row of pixels, or any subset of pixels to the optically active state allowing for the imaging to repeat blocks 404 through 412 to obtain another image of an object of interest. The method 400 may be performed iteratively capturing a plurality of images of one or more objects of interest. The method 400 may be terminated manually by a user of the barcode reader 100, or automatically after one or more of a predetermined number of images have been obtained. Further, the barcode reader 100 may terminate the method 400 based on analysis of an obtained image determined to have an image quality value at or above an image quality value threshold.

In configurations, the transition of the obfuscator 310 from the obfuscative state to the transmissive state, or from the transmissive state to the obfuscative state, occurs faster than an image blur threshold. The image blur threshold is a duration of time limit at which a slower obfuscator state transition results in a captured image that is unable to be decoded by the barcode reader 100. Obfuscator transitions faster than the image blur threshold result in captured images that are able to be decoded by the barcode reader 100. The time value of the image blur threshold may be dependent on characteristics of the imaging sensor 306, for example an exposure time, temporal resolution, spatial resolution, number of pixels, size of pixels, type of sensor, etc. Further, the image blur threshold may depend on the static or dynamic nature of the object of interest 102 being scanned, for example the speed at which an object of interest traverses the field of view 120, an illumination of the object of interest, a distance of the object of interest, etc.

The transition speed of the obfuscator 310 may be controllable to provide different resultant obtained images. The controller 314 may cause the obfuscator 310 to begin transitioning from the obfuscative state to the transmissive state before all the pixels are in the active state, and further the controller 314 may transition the obfuscator 310 back to the obfuscative state just after some of the pixels are deactivated and signal data is being read out. Such an implementation would maximize light exposure of the pixels, but could result in some motion blur in an obtained image, although the motion blur would be less than with other rolling shutter systems.

The method 400 may further include the light source 302 providing illumination to the object of interest 102 in the field of view 120 during periods of time when the obfuscator 310 is in the transmissive state. This allows for illumination of the object of interest 102 in situations when ambient light is not bright enough to obtain a quality image of the object of interest 102 for decoding of indicia in the image. Further, the light source 302 may turn off during periods of time when the obfuscator is in the obfuscative state. The method 400 may also include providing, by the target radiation source 303, target radiation to the object of interest at various times. For example, the target radiation source 303 may provide target radiation to a region in the field of view 120 only during periods of time when the obfuscator 310 is in the obfuscative state to prevent the image sensor 306 from imaging any of the target radiation. The target radiation source 303 may provide target radiation during periods of time when the obfuscator 310 is in the obfuscative state and the transmissive state so that an image of the object of interest includes the target radiation for assisting in image processing and decoding indicia in the obtained image.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Alternative implementations of the examples represented by the block diagram of the system 200 of FIG. 2 includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application-specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method of capturing an image with an optical assembly for an optical imaging shutter system, the method comprising:
setting, by a controller, a current state of an obfuscator to a transmissive state at a first point in time, the first point in time being a time when all pixels of an imaging sensor are in an active state;
obtaining, by an imaging sensor having the plurality of pixels, an image of an object in a field of view of the imaging sensor, the image obtained at a time when the obfuscator is in the transmissive state; and
setting, by the controller, the current state of the obfuscator to an obfuscative state at a point in time before a single pixel of the plurality of pixels is switched to an inactive state, wherein the active state is a state in which a pixel is an active optical detector, and the inactive state is a state in which a pixel is not an active optical detector,
wherein the transition of the obfuscator from the obfuscative state to the transmissive states occurs faster than a temporal image blur threshold, wherein the temporal image blur threshold is a time duration limit at which a transition of the obfuscator slower than the temporal image blur threshold results in an image that contains too much blur to decode.

2. The method of claim 1, wherein the obfuscator comprises a transflector.

3. The method of claim 1, wherein the obfuscator comprises an electrochromic device.

4. The method of claim 1, wherein the obfuscator comprises an polymer-dispersed liquid crystal film.

5. The method of claim 1, wherein the imaging sensor comprises a rolling shutter sensor.

6. The method of claim 1, wherein the transmissive state comprises a state wherein the obfuscator transmits more than 50% of radiation incident on the obfuscator along an optical axis, and wherein the obfuscative state is a state wherein the obfuscator obfuscates more than 50% of radiation incident on the obfuscator along the optical axis.

7. The method of claim 1, further comprising, providing, by an illumination source, illumination to the object during a period of time when the obfuscator is in the transmissive state.

8. The method of claim 1, further comprising, providing, by a targeting source, target illumination in the field of view of the imaging sensor during a period of time when the obfuscator is in the obfuscative state.

9. The method of claim 1, wherein the imaging sensor has a fixed exposure time; and wherein setting the current state of the obfuscator to the transmissive state comprises setting the state of the obfuscator to the transmissive state for a duration dependent upon the fixed exposure time of the imaging sensor.

10. An optical imaging shutter system comprising:
an obfuscator disposed along an optical axis configured to receive radiation from an object of interest, the obfuscator having (i) a first state wherein the obfuscator obfuscates a majority of radiation propagating along the optical axis, and (ii) a second state wherein the obfuscator transmits a majority of radiation propagating along the optical axis;
a controller communicatively coupled to the obfuscator and configured to control a current state of the obfuscator;
an imaging sensor disposed along the optical axis configured to receive an image of the object and to generate an electrical signal indicative of the received image, the imaging sensor having a plurality of pixels with each pixel of the plurality of pixels having an (i) active state wherein the pixel is active as an optical sensor for an active duration of the pixel, and (ii) an inactive state wherein the pixel is not active as an optical sensor for an inactive duration of the pixel;

a processor and computer-readable media storing machine readable instructions that, when executed, cause the optical assembly to:

set, by the controller, the current state of the obfuscator to the second state at a point in time when all pixels of the plurality of pixels are in an active state;

obtain, by the imaging sensor, an image of the object during an image capture duration wherein all of the pixels of the plurality of pixels are in the active state; and set, by the controller, the current state of the obfuscator to the first state at a point in time before a single pixel of the plurality of pixels is in an inactive state, wherein a transition of the obfuscator from the first state to the second states occurs faster than a temporal image blur threshold, wherein the temporal image blur threshold is a time duration limit at which a transition of the obfuscator slower than the temporal image blur threshold results in an image that contains too much blur to decode.

11. The system of claim 10, wherein the obfuscator comprises one of a transflector, an electrochromic device, or a polymer-dispersed liquid crystal film.

12. The system of claim 10, wherein the imaging sensor comprises a rolling shutter sensor.

13. The system of claim 10, wherein the second state comprises a state wherein the obfuscator transmits more than 50% of radiation incident on the obfuscator along an optical axis, and wherein the first state is a state wherein the obfuscator obfuscates more than 50% of radiation incident on the obfuscator along the optical axis.

14. The system of claim 10, further comprising, an illumination source that provides illumination to the object during a period of time when the obfuscator is in the second state.

15. The system of claim 10, further comprising, providing, by a targeting source, target illumination in the field of view of the imaging sensor during a period of time when the obfuscator is in the first state.

16. The system of claim 10, wherein the imaging sensor has a fixed exposure time; and wherein to set the current state of the obfuscator to the second state the computer-readable media cause the optical assembly to set the state of the obfuscator to the second state for a duration of time dependent upon the fixed exposure time of the imaging sensor.

17. An optical assembly for an optical imaging shutter system, the optical assembly comprising:

an obfuscator disposed along an optical axis configured to receive radiation from an object of interest, the obfuscator having (i) a first state wherein the obfuscator obfuscates a majority of radiation propagating along the optical axis, and (ii) a second state wherein the obfuscator transmits a majority of radiation propagating along the optical axis; and an imaging sensor disposed along the optical axis configured to receive an image of the object and to generate an electrical signal indicative of the received image, the imaging sensor having a plurality of pixels with each pixel of the plurality of pixels having an (i) active state wherein the pixel is active as an optical sensor for an active duration of the pixel, and (ii) an inactive state wherein the pixel is not active as an optical sensor for an inactive duration of the pixel, wherein a transition of the obfuscator from the first state to the second states occurs faster than a temporal image blur threshold, wherein the temporal image blur threshold is a time duration limit at which a transition of the obfuscator slower than the temporal image blur threshold results in an image that contains too much blur to decode.

18. The optical assembly of claim 17, wherein the obfuscator comprises one of a transflector, an electrochromic device, or a polymer-dispersed liquid crystal film.

* * * * *